Jan. 25, 1955
W. A. KUEHL
2,700,721
ELECTRIC SOLDERING IRON
Filed Oct. 20, 1952
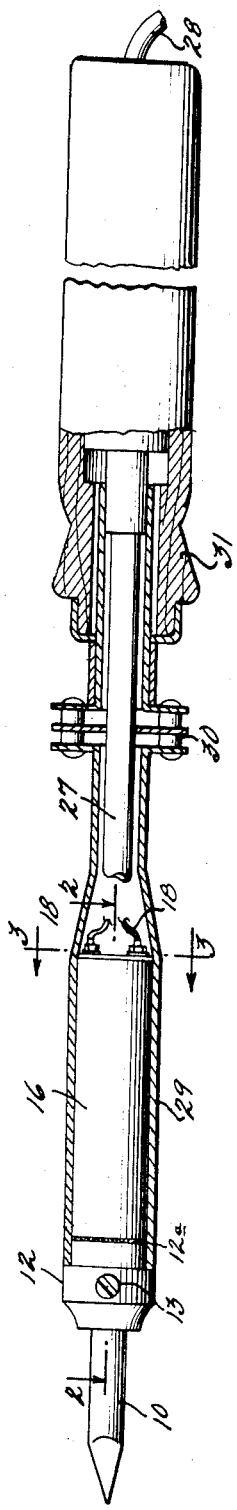
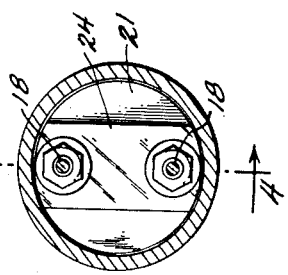
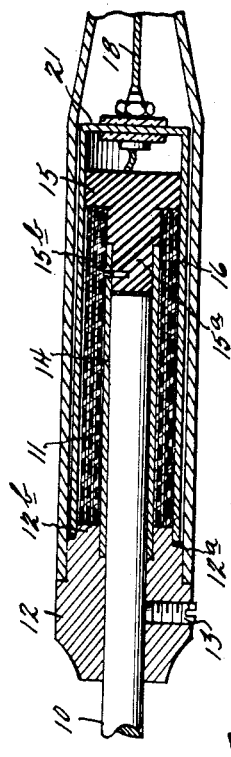
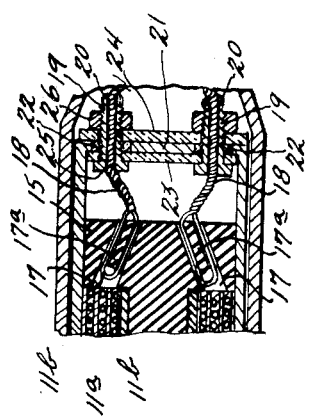
INVENTOR
WALTER A. KUEHL
BY *Bu. J. Chrony*
*his* ATTORNEY United States Patent Office 2,700,721
Patented Jan. 25, 1955

2,700,721

ELECTRIC SOLDERING IRON

Walter A. Kuehl, Chicago, Ill.

Application October 20, 1952, Serial No. 315,681

4 Claims. (Cl. 219—26)

This invention relates to electric soldering irons in general. More particularly, this invention relates to electric soldering irons in which the heating unit is sealed substantially completely from air so as to increase the life thereof.

It is, therefore, an object of this invention to provide an improved soldering iron in which the housing of the heating element is so constructed that the life of the heating element is greatly increased.

Another object of this invention is to provide an improved soldering iron in which the heating element is hermetically sealed.

Still another object of this invention is to provide an improved electric soldering iron in which the oxidation of the heating element is substantially eliminated.

A further object of this invention is to provide a casing for an electrical heating element, said casing being so constructed as to seal the heating element from access to air or other gases having a deteriorating effect thereon.

Other and further objects of this invention will be apparent to those skilled in the art to which it relates from the following specification, claims and drawing.

In accordance with this invention, there is provided a housing construction for the electrical heating element of a device such as a soldering iron, in which the heating element is so encased as to prevent access of air or other deleterious fumes or gases to said heating element. The construction disclosed herein has been extensively tested and it has been found that soldering irons employing this construction have greatly extended useful lives, thus resulting in considerable savings.

The details of construction of this improved soldering iron are set forth in detail in the following specification and in the drawing in which, briefly:

Fig. 1 is a view in side elevation and partial section of a soldering iron embodying this invention;

Fig. 2 is a sectional view of the heating element portion of the soldering iron;

Fig. 3 is a sectional view along the line 3—3 of Fig. 1; and

Fig. 4 is a view along the line 4—4 of Fig. 3.

Referring to the drawings in detail there is illustrated in Fig. 1 a view, partially in cross-section, of a soldering iron embodying this invention. This soldering iron employs a soldering tip 10 that is made of metal such as copper or the like. The surface of this soldering tip may be coated with corrosion resisting materials in the form of alloys that resist oxidation at temperatures to which this tip is heated. This heated tip 10 is in the shape of a rod that extends into the inside of the heating element 11 of the soldering iron through a hole formed in the member 12 and it is held in this member by the set-screw 13.

The heating unit 11 is made up of a multiple-layered coil of high resistant wire or tape that may be made of alloys such as "Nichrome" and the layers of the coil are separated by heat resisting material such as mica as shown in Figs 2 and 4. The heating coil is wound upon a tubular support 14 that is forced into the hole formed in the member 12 and is frictionally retained therein. The heating coil 11 is also insulated from the tubular support 14 by a layer of mica. One end of the mica insulation and heating coil assembly abuts the end 12b of the member 12 and the other end of this assembly abuts the insulation member 15 which is made of heat resisting insulating material such as "Alsimag" or "Lavite." This insulation member 15 is provided with a body that fits into the tubular housing 16 and has a diameter slightly less than the inside diameter of this tubular housing. The outside diameter of the heating coil assembly is substantially the same as that of the body of the insulation member 15. The outside of the heating coil assembly 11 is also insulated from the inside of the tubular housing 16 by a layer of mica.

The insulation member 15 is provided with a short projection 15a of stepped configuration. One portion of this projection is made of smaller diameter so as to fit into the inside of the tube 14 and extend thereinto a short distance and the other portion of this insulation member is made of a diameter substantially the same as the outside diameter of the tubular member 14. The insulation member 15 is held assembled to the tubular member 14 by the pin 15b.

The ends of the heating coil conductor are brought out through holes 17 formed in the insulation member 15 as shown in Fig. 4. Each of these holes is provided with a rib 17a in the center thereof so that the twisted conductors 18, around which the end portions of the conductor forming the heating coil are wound, may be looped around this rib and anchored to this insulation member.

The ends of the heating coil conductor may also be wound around the twisted conductors 18 for some distance in order to improve the electrical connection therebetween and these conductors 18 are then passed through the feed-through screws 19. When these lead conductors 18 are in their proper positions in these feed-through screws, these conductors 18 are hard soldered by silver solder 20 to the outer ends of these feed-through screws 19 so that the ends of the holes through these screws 19 are completely sealed by the solder 20 in air-tight fashion.

The screws 19 are supported in holes formed in the end 21 of the housing 16, however, these screws are electrically insulated from the end 21 of the housing by suitable heat-resisting insulation washers 22 which surround these screws and by insulation sheets 23 and 24 which are positioned on each side of the housing end 21. Suitable apertures are formed in the insulation plates 23 and 24 for the purpose of receiving the screws 19.

Each of these screws 19 is provided with a head 25 and with a nut 26 for holding these screws and the afore-said insulation assembled on the housing end 21 in air-tight fashion so that air cannot leak into the housing 16 past these screws even after the soldering iron is repeatedly heated and allowed to cool. This is an important feature of this invention since it is obvious that differences in pressure will be obtained between the inside and the outside of the housing 16 during and after repeated heating. After repeated heating of the element 11 the atmosphere inside of the housing 16 will have little or no free oxygen therein and this atmosphere will consist principally of nitrogen at somewhat less than atmospheric pressure. If desired, the original atmosphere may be pumped out of the housing 16 after the heating element is assembled therein and an atmosphere of nitrogen may be placed into the housing through one of the feed-through screws 19 around the conductor 18 and thereafter this feed-through screw may be sealed by solder 20 as described above. On the other hand, if desired, the nitrogen may be inserted into the housing through a separate hole formed through the housing 16, said hole being sealed after the desired gas is pumped into the housing. Other gases besides nitrogen such as carbon dioxide or other substantially inert gases or mixtures thereof may be used at lower than atmospheric pressure or greater than atmospheric pressure if desired.

The conductors 18 are led through the perforated insulation member 27 into the handle end of the soldering iron where these conductors are attached to the power supply cord 28 that is provided to the iron. The housing 16 is hard soldered to the tip supporting member 12 as indicated at 12a and is placed into the outer housing 29 of the soldering iron. The solder 12a may be applied at the same time as the solder 20 is applied. The outer housing 29 is fitted to the member 12 and for this purpose this member 12 is provided with a portion of reduced diameter which fits tightly into the open end of the housing 29. The main body diameter of the member 12 is substantially the same as the outer diameter of the housing 29 as illustrated. The other end of the housing 29 is of reduced diameter and is attached to the heat-radiating baffle structure 30 which, in turn, is attached to the handle 31 of the iron.

While I have described this invention in detail with respect to a preferred embodiment thereof, I do not desire to limit this invention to the exact details illustrated and described, except insofar as they are defined by the appended claims.

I claim:

1. An electric soldering iron comprising an electric heating coil consisting of a plurality of turns of resistance wire, a soldering tip adapted to extend into said heating coil to be heated thereby, a metallic member having a hole through the center thereof for receiving the body of said soldering tip, a metallic tubular member extending into the center of said heating coil and adapted to receive said body of said soldering tip, one end of said tubular member being forced into said metallic member in airtight fashion, an insulation member having a portion fitted into the other end of said tubular member to limit the distance that said body of said soldering tip may be inserted into said tubular member, and a metallic housing for said heating coil, the front edge of said housing being fitted over a portion of the rear of said metallic member to hermetically seal said housing against the outer atmosphere so as to exclude said outer atmosphere and protect said heating coil from the oxidizing action thereof.

2. An electric soldering iron as set forth in claim 1 further characterized in that the said housing extends over the outside of the said heating coil and abuts the said rear portion of said metallic member, and sealing means for sealing said housing to said metallic member along said abutment.

3. An electric soldering iron as set forth in claim 1 further characterized in that the said insulation member is provided with perforations for receiving the ends of the resistance wire of said heating coil, said perforations having means for anchoring the ends of the wire of said heating coil so as to prevent pulling strain from being exerted upon the wire in said heating coil.

4. An electric soldering iron as set forth in claim 1 further comprising feed-through screws positioned in apertures formed in said housing, insulation means for insulating said feed-through screws from said housing in airtight fashion, conducting wires passing through said feed-through screws to contact the ends of said heating coil and means for sealing said conducting wires in said feed-through screws.

References Cited in the file of this patent

UNITED STATES PATENTS

| | | |
|---|---|---|
| 1,459,307 | Laise et al. | June 19, 1923 |
| 1,770,824 | Abbott | July 15, 1930 |
| 1,961,496 | Holmes | June 5, 1934 |
| 2,073,259 | Young | Mar. 9, 1937 |
| 2,446,555 | Sage | Aug. 10, 1948 |
| 2,512,426 | Hartley | June 20, 1950 |